United States Patent
Stimpson

[11] Patent Number: 5,415,418
[45] Date of Patent: May 16, 1995

[54] ENGINE ASSEMBLY AID

[76] Inventor: Curtis J. Stimpson, 4340 Strohm Ave., North Hollywood, Calif. 91602

[21] Appl. No.: 903,740

[22] Filed: Jun. 24, 1992

[51] Int. Cl.6 ............................................. F16J 9/00
[52] U.S. Cl. ...................................... 277/2; 277/235 B
[58] Field of Search .............. 277/2, 9, 9.5, 235 B; 33/562, 563, DIG. 15, 600, 611, 1 G; 116/212; 40/299, 360; 123/90.37, 90.38

[56] References Cited

U.S. PATENT DOCUMENTS

| | | | |
|---|---|---|---|
| 2,867,464 | 1/1959 | Crampton | 123/90.38 |
| 2,877,756 | 3/1959 | McCauley et al. | 123/90.38 |
| 2,949,798 | 8/1960 | Berta, Jr. | 33/563 |
| 3,795,983 | 3/1974 | Gallagher et al. | 33/563 |
| 3,841,377 | 10/1974 | Kinney | 157/1.5 |
| 3,913,927 | 10/1975 | Gordon | 123/90.37 |
| 4,039,247 | 8/1977 | Lawman et al. | 359/398 |
| 4,402,518 | 9/1983 | Locacius | 123/90.38 |
| 4,493,815 | 1/1985 | Fernwood et al. | 210/232 |
| 4,593,659 | 6/1986 | Wells et al. | 123/90.38 |
| 5,107,601 | 4/1992 | Semchuck | 33/563 |

Primary Examiner—Daniel G. DePumpo
Attorney, Agent, or Firm—Blakely, Sokoloff, Taylor & Zafman

[57] ABSTRACT

A template in the form of a valve cover gasket has torquing sequence information for each head bolt imprinted thereon in close proximity to the respective head bolts. Alternatively, the template may be provided in other forms which are nevertheless mechanically indexed to the valve cover studs so that the torquing sequence will be in proper registration with the corresponding head bolts.

10 Claims, 1 Drawing Sheet

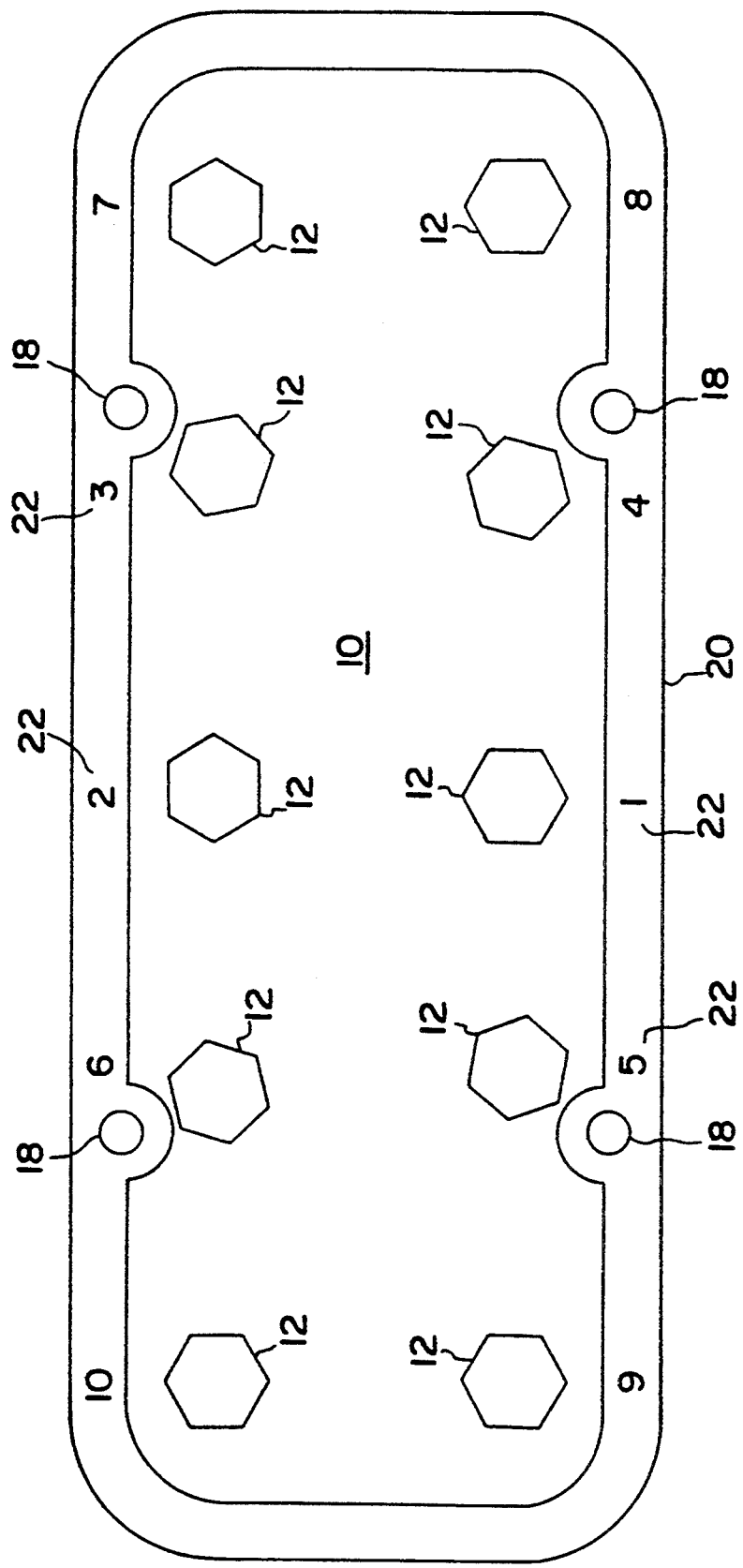

ENGINE ASSEMBLY AID

BACKGROUND OF THE INVENTION

1. Field of the Invention

This invention relates to the field of internal combustion engines, and particularly to a device for assisting an engine assembler to torque the head bolts of the engine in the proper sequence.

2. Description of the Prior Art and Related Information

Internal combustion engines of the type with reciprocating pistons are generally constructed with a cylinder block and a separable cylinder head. The cylinder head is typically secured to the cylinder block by a plurality of bolts ("head bolts") threaded into the cylinder block. In many engines, studs are inserted into the cylinder block and the head is then secured by nuts threaded over the top of each stud.

When assembling the cylinder head to the cylinder block, either during initial assembly of the engine or following an overhaul procedure, it is critical that each of the head bolts or nuts, as the case may be, be tightened to a specified torque setting in the proper sequence. The torquing sequence is important for ensuring proper compression of the head gasket placed between the cylinder block and the cylinder head. It is also important to prevent warping of the cylinder head which may occur if the head bolts are torqued in the improper sequence.

When fitting a cylinder head to the cylinder block, the assembler will typically refer to a chart or diagram, usually in an engine assembly or repair manual, which illustrates the head bolt torquing sequence. Such a reference tool is frequently inconvenient as it may not be readily available at the time of assembly. Moreover, such a diagram is easily soiled during the assembly process, perhaps making it unsuitable for use at a later time.

Because of the inconvenience of traditional torquing sequence diagrams, assemblers are frequently tempted to rely on memory of the proper torquing sequence or to simply disregard the importance thereof. The consequences of doing so may result in premature engine failure.

SUMMARY OF THE INVENTION

The present invention provides a convenient template that may be used during engine assembly to provide a ready reference for the correct head bolt torquing sequence. In a preferred embodiment of the present invention, the template is provided in the form of a valve cover gasket with the torquing sequence imprinted thereon in close proximity to the respective head bolts. Alternatively, the template may be provided in other forms which are nevertheless mechanically indexed to the valve cover studs so that the torquing sequence will be in proper registration with the corresponding head bolts.

BRIEF DESCRIPTION OF THE DRAWING

The figure is a plan view of a typical cylinder head to which a preferred embodiment of the present invention has been applied in the form of a valve cover gasket.

DETAILED DESCRIPTION OF THE INVENTION

In the following description, for purposes of explanation and not limitation, specific numbers, dimensions, materials, etc. are set forth in order to provide a thorough understanding of the present invention. However, it will be apparent to one skilled in the art that the present invention may be practiced in other embodiments that depart from these specific details. In other instances, detailed descriptions of well known mechanical elements are omitted so as to not obscure the description of the present invention with unnecessary detail.

Referring to the figure, a typical cylinder head 10 for a conventional internal combustion engine is shown in plan view. In this case, cylinder head 10 accommodates four combustion chambers such as would be the case for a four cylinder engine or for one bank of a V8 engine. Cylinder head 10 is secured to the cylinder block (not shown) by head bolts 12. In this case, there are ten such head bolts. The number of head bolts or stud and nut combinations naturally varies from engine to engine. While this description refers throughout to the use of head bolts, it is to be understood that the same principles apply when a stud and nut combination is used, and thus the term "head bolt" will encompass a stud and nut combination as well.

It will be understood to those skilled in the art that valve gear for the underlying cylinders is arrayed on top of cylinder head 10, but has been omitted from the figure for clarity. To protect the valve gear and to contain the lubricating oil supplied thereto, a valve cover (not shown) is fastened to the top of cylinder head 10. This is accomplished by means of valve cover studs 18. To prevent oil seepage between the valve cover and the cylinder head, a valve cover gasket 20 is used. Various materials may be used for the manufacture of valve cover gasket 20. These include laminated paper, fiber composite, synthetic rubber and cork. The main requirement is that the material be somewhat resilient and substantially impermeable to the engine lubricating oil.

In a preferred embodiment of the present invention, a valve cover gasket 20 is provided with head bolt torquing sequence indicia 22 imprinted thereon. In the case illustrated in the figure, each of head bolts 12 is assigned a number from 1 to 10 which indicates the order in which the bolt should be tightened to a predetermined torque value. In practice, the head bolts are generally torqued in sequence to one or more intermediate torque values prior to the final tightening of each bolt.

Indicia 22 are imprinted on valve cover gasket 20 in approximate proximity to each of the head bolts 12. In some cases, such as where a head bolt is not located near the perimeter of the cylinder head, arrows or other directional indicia may be combined with the numerical indicia to positively identify the proper head bolts associated with the torquing sequence numbers. Thus, by installing the valve cover gasket 20 prior to tightening the head bolts, an engine assembler is presented with a ready reference of the proper head bolt torquing sequence. It will be understood that it is somewhat unusual to apply the valve cover gasket at this stage of assembly since it is more commonly done immediately prior to installing the valve cover. However, provided that the assembler exercises a reasonable degree of care, the valve cover gasket is not likely to be damaged by subsequent assembly steps.

Indicia 22 are preferably imprinted on valve cover gasket 20 by means of a silk-screen process. However, other printing techniques may be used as may be appropriate for the particular material used for the gasket. Furthermore, indicia 22 may be applied by means other than printing. For example, indicia 22 may be embossed or molded into the gasket material.

Although the preferred embodiment of the present invention comprises a valve cover gasket, the invention may be more generally embodied in a template of suitable shape that is laid over cylinder head 10 and mechanically indexed thereto with holes, slots or similar devices in the template that register with the valve cover studs. Such mechanical indexing ensures that the torquing sequence indicia will be in proper registration with the corresponding head bolts.

It is recognized that the above-described invention may be embodied in other specific forms without departing from the spirit or essential characteristics of the disclosure. Thus, it is understood that the present invention is not to be limited by the foregoing illustrative details.

I claim:

1. An assembly aid for an internal combustion engine having a cylinder head secured to a cylinder block by a plurality of first threaded fasteners, said engine further having a valve cover secured to the cylinder head by a plurality of second threaded fasteners, said engine assembly aid comprising a template applied to the cylinder head having means for mechanical registration with the second threaded fasteners and having indicia on said template in approximate proximity to each of the first threaded fastener locations for indicating a torqing sequence for the respective first threaded fastener, wherein the template comprises a valve cover gasket.

2. The engine assembly aid of claim 1 wherein the valve cover gasket is made of laminated paper.

3. The engine assembly aid of claim 1 wherein the valve cover gasket is made of fiber composite.

4. The engine assembly aid of claim 1 wherein the valve cover gasket is made of cork.

5. The engine assembly aid of claim 1 wherein the valve cover gasket is made of synthetic rubber.

6. An improved valve cover gasket for an internal combustion engine having a cylinder head secured to a cylinder block by a plurality of threaded fasteners wherein the improvement comprises indicia on the valve cover gasket in approximate proximity to each of the threaded fastener locations for indicating a torquing sequence for the respective threaded fasteners.

7. The improved valve cover gasket of claim 6 wherein the valve cover gasket is made of laminated paper.

8. The improved valve cover gasket of claim 6 wherein the valve cover gasket is made of fiber composite.

9. The improved valve cover gasket of claim 6 wherein the valve cover gasket is made of cork.

10. The improved valve cover gasket of claim 6 wherein the valve cover gasket is made of synthetic rubber.

* * * * *